United States Patent [19]

McGarry

[11] Patent Number: 4,985,910
[45] Date of Patent: Jan. 15, 1991

[54] METHOD AND APPARATUS FOR RETROFITTING A STANDARD COIN OPERATED TELEPHONE EMPLOYING A CARBON MICROPHONE WITH A LINE POWERED ELECTRONIC CONTROLLER

[75] Inventor: Patrick J. McGarry, West Chester, Pa.

[73] Assignee: Mars Incorporated, McLean, Va.

[21] Appl. No.: 407,896

[22] Filed: Sep. 15, 1989

[51] Int. Cl.$^5$ ............................................. H04M 17/02
[52] U.S. Cl. ..................................... 379/27; 379/146; 379/155; 381/112
[58] Field of Search .................. 379/146, 143, 155, 27; 381/180, 112

[56] References Cited
U.S. PATENT DOCUMENTS 3,132,207  5/1964  McCalla .............................. 381/112

Primary Examiner—Stafford D. Schreyer
Attorney, Agent, or Firm—Davis Hoxie Faithfull & Hapgood

[57] ABSTRACT

A method and apparatus to enable a low power telephone controller to operate with either a carbon microphone or a dynamid microphone is described. A jumper in a preamplifier and filter circuit is preset to accommodate the audio transfer characteristics of one or the other type of microphones. For either microphone, a small DC current of less than 500 μA is used to sense the presence of either type microphone and serves the dual role of biasing the carbon microphone to the appropriate level to be amplified so that the input to an audio circuit in the controller us very nearly the same for either microphone. The audio circuit then processes and dynamically balances the signal to the telephone line, where it is output.

23 Claims, 3 Drawing Sheets

METHOD AND APPARATUS FOR RETROFITTING A STANDARD COIN OPERATED TELEPHONE EMPLOYING A CARBON MICROPHONE WITH A LINE POWERED ELECTRONIC CONTROLLER

FIELD OF THE INVENTION

The invention relates to low power control apparatus for retrofitting standard coin operated telephones already in the field or for addition to new coin operated telephones with a minimum of design changes to the standard design of such phones. More particularly, the invention relates to method and apparatus permitting the use of a low power controller which operates utilizing power from the phone line, with a coin operated telephone which contains a carbon microphone in the handset. As an added benefit, the present invention is also readily compatible with handsets employing dynamic microphones.

BACKGROUND OF THE INVENTION

Until relatively recently, standard coin operated telephones contained carbon microphones in their handsets. These carbon microphones passively balanced the line and pulled 5 milliamperes (mA) or more during their normal operation.

With the advent of deregulation of the telephone industry, a demand arose for low power telephone controllers incorporating various features, and a number of phones were introduced which employed dynamic microphones. Although dynamic microphones are more expensive than carbon microphones, they offer better fidelity. Further, as long recognized in the prior art, the usage of a dynamic microphone required the addition of circuitry to amplify the microphone output and dynamically balance the line. In one highly advanced low power electronic controller, the LES 100 WE Electronic Payphone Retrofit Kit, developed and sold by Mars Electronics, the overall power constraints on the design of the controller did not permit the steady usage of a current of 5 mA or higher as typically employed by a carbon microphone. Consequently, the carbon microphone was replaced with a dynamic microphone. While this microphone did not require any external current supply to operate, a current of approximately 100 microamperes (uA) was used to detect the presence or absence of this microphone. The Mars Electronics LES 100 controller is substantially as described in U.S. application Ser. No. 07/199,129 filed May 26, 1988, now U.S. Pat. No. 4,926,458, and assigned to the assignee of the present invention.

While that controller has enjoyed immediate commercial success as a retrofit for use with standard Western Electric payphones, its installation has required a modification of each standard payphone being retrofit to replace its standard carbon microphone with a more expensive dynamic microphone.

SUMMARY OF THE INVENTION

Because the vast majority of existing pay telephones contain carbon microphones, it was recognized that if possible it would be desirable to not have to change the microphone when retrofitting present phones or building new phones of a similar design to the standard phone but with an electronic controller. Because some telephones may include dynamic microphones, it was also highly desirable to design a single controller readily suitable for use with either type of microphone.

It is therefore an object of the present invention to provide a method and apparatus to enable the use of a line powered electronic controller with either a carbon microphone or a dynamic microphone. In one embodiment of the present invention, the changing of a single jumper wire makes this possible. A single two position switch could replace this jumper if desired. With the present invention, either type of microphone can be used. Contrary to the prior art which operates the carbon microphone with power provided directly from the tip and ring lines, the present invention operates the carbon microphone with a substantially smaller amount of power from a low voltage source which supplies a DC bias voltage across the carbon microphone so that its output voltage can be amplified to provide an output highly similar to that for a dynamic microphone. Because these two types of microphones have different frequency responses, a circuit is provided which switches in different filters depending on whether a carbon or dynamic microphone is used. The high frequency response of the carbon microphone is improved when the switch is in one position, and the low frequency response of the dynamic microphone is improved when the switch is in the other position. Amplification is also provided for the audio signal that is generated, and a suitable audio network is interposed between whichever microphone is used and the line in order to balance the line.

Further details of the present invention are provided below in conjunction with the discussion of the drawings.

DETAILED DESCRIPTION

As background, a carbon microphone can be modeled as a variable resistor which changes in resistance value with voice pressure changes as a caller speaks into the mouthpiece containing the carbon microphone. For payphone usage, the carbon microphone is typically designed to match the impedance of the line so that it steadily draws approximately 5 mA or more of current to operate.

Conversely, dynamic microphones may be modeled as voltage sources and require no current to operate; however, their output must be properly amplified and balanced to the line. By way of example, the Mars Electronics LES 100 low power telephone controller operates under severe power constraints. It utilizes approximately 100 uA of current for test purposes in conjunction with its dynamic microphone circuit. Using the present invention, either type of microphone can be employed with a small enough drive current so that either microphone can be used with a line powered controller.

Figure 1:
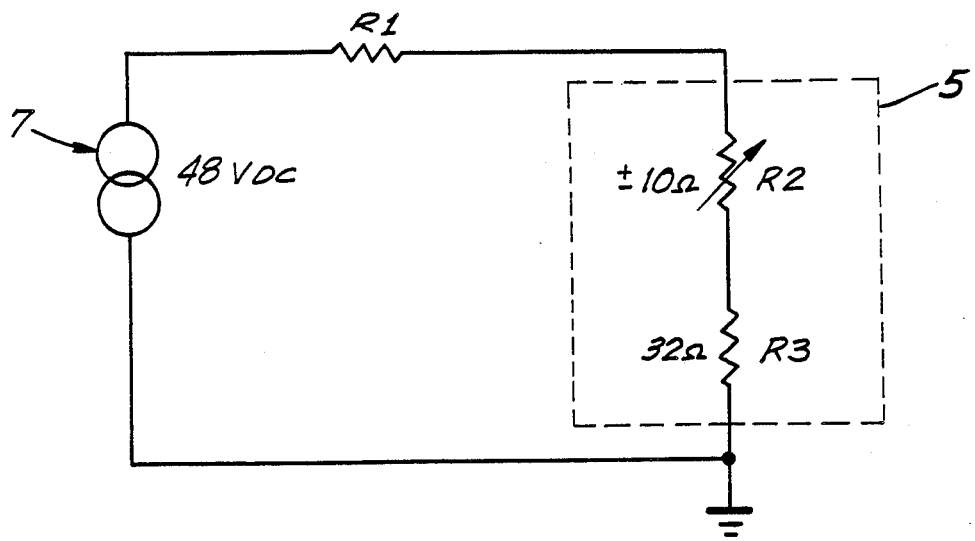
FIG. 1 is a simplified model of a telephone loop circuit with a carbon microphone passively balancing the line to illustrate the prior art usage of carbon microphones in standard Western Electric payphones.

Turning to the drawings, FIG. 1 is a simplified circuit diagram which provides a rough model of a telephone loop circuit with a carbon microphone 5 passively balancing the line as taught by the prior art. A voltage source 7 of 48 Volts DC represents the loop power provided by a central office 4 (shown in FIG. 2), a resistor R1 represents the loop impedance, and a variable resistor R2 and a fixed value resistor R3 together represent the carbon microphone 5.

As depicted in FIG. 1, the carbon microphone 5 is modeled as a resistor which changes in value with sound pressure as a caller speaks. Carbon microphones typically are 32 ohms and change plus or minus 10 ohms when the caller speaks into the microphone causing the carbon powder in the microphone to move. Designed to passively match the impedance of the line, carbon microphones, such as those manufactured by the Audiosears Corporation, have been in use in standard coin operated telephones for many years. In their standard connection, they steadily draw 5 mA or more.

A line powered low power controller probably will not be able to provide a steady current of 5 mA or more to the microphone due to its overall power constraints and the large number of other functions to be controlled using very limited power. Consequently, in the low power controller circuit of U.S. application Ser. No. 199,129 a dynamic microphone, which offered better fidelity was used. In this controller the microphone output is amplified and a full dynamic balancing technique is used to balance the dynamic microphone to the telephone line.

The present invention recognizes that it is desirable to have a low power controller to control the performance of various pay telephone functions which can be retrofit to pay telephones without the need to replace the standard carbon microphone. As explained further below, the present invention satisfies that desire by being designed to use the same small current used to sense the dynamic microphone to appropriately bias the carbon microphone.

Figure 2:
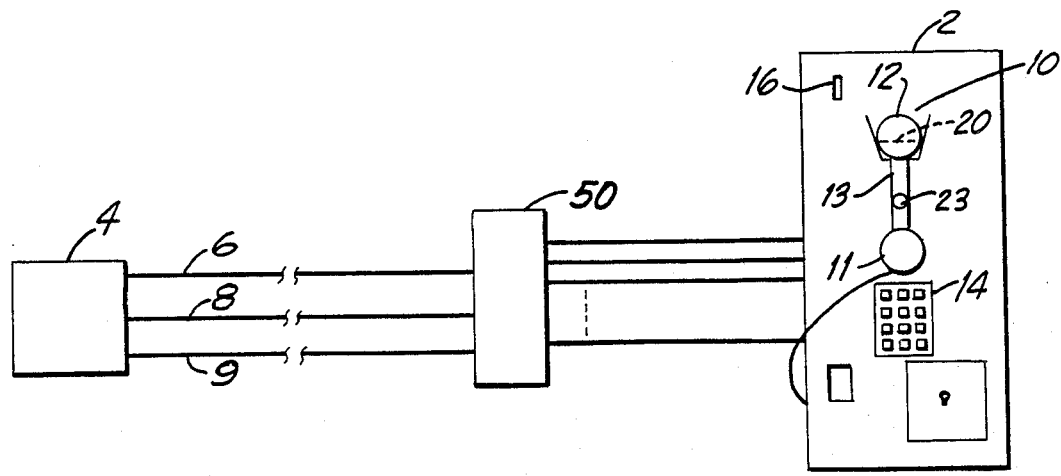
FIG. 2 illustrates a standard pay telephone retrofit with a low power controller according to the present invention so that it is connected to a central office through a low power controller.
Figure 3:
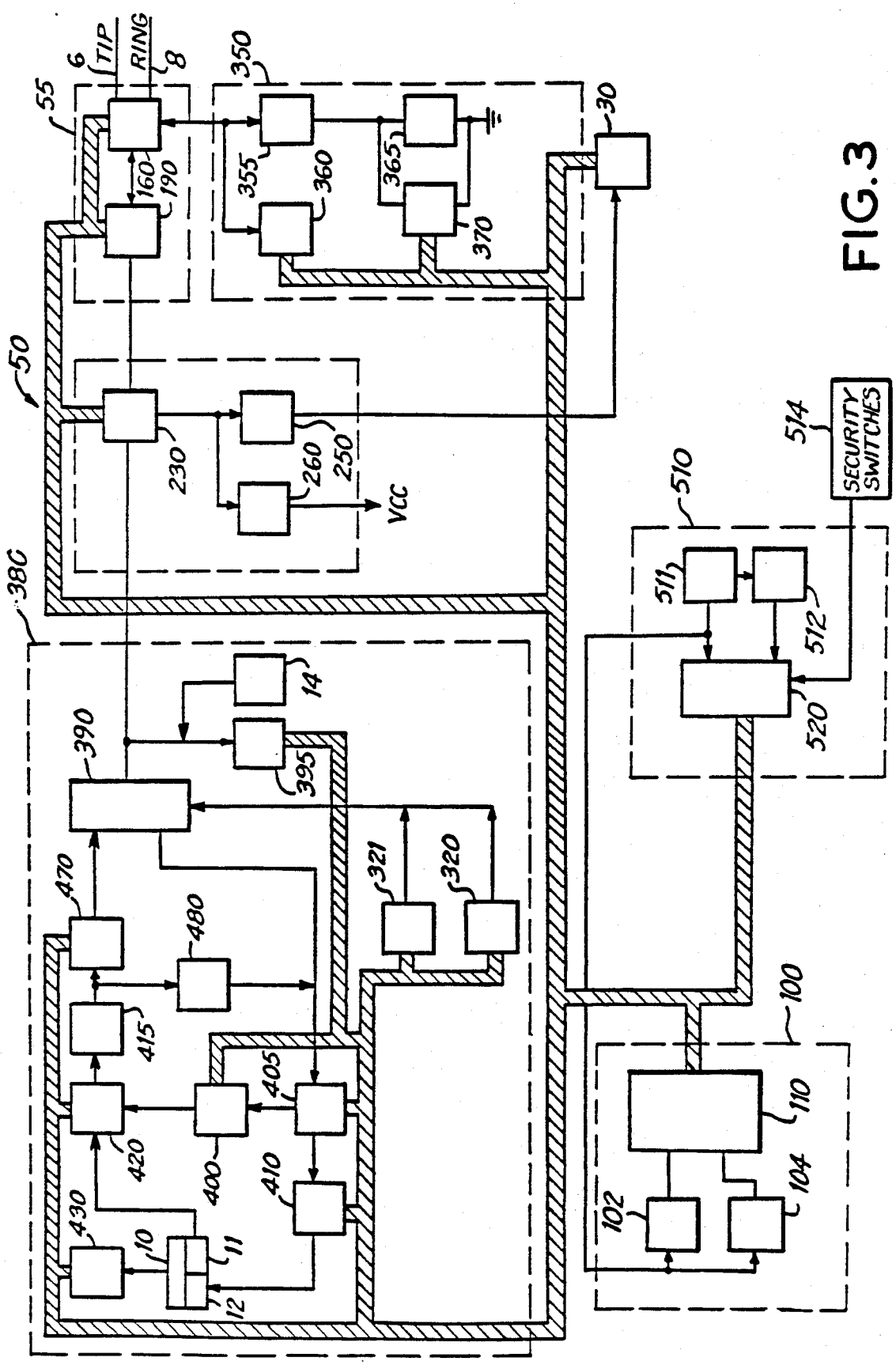
FIG. 3 is a block diagram of the low power controller of FIG. 2 according to one embodiment of the present invention.

FIG. 2 is a block diagram of a standard coin operated telephone or payphone 2 connected to include a low power controller 50 shown in greater detail in FIG. 3. A caller deposits coins in a coin slot 16, dials a number on a keypad 14 and uses a handset 10 to make a call. The central office 4 provides power on tip 6 and ring 8 lines to the payphone 2 and connects calls. As has been previously described in U.S. application Ser. No. 199,129, the varying DC voltages and AC ringing voltage provided by the central office 4 are interpreted by the low power controller 50 as providing operational commands and power for controlling various operations of the coin telephone 2. U.S. application Ser. No. 199,129, filed on May 26, 1988 is incorporated by reference herein. In a presently preferred embodiment, the present invention is embodied in the control circuit of U.S. application Ser. No. 199,129 as modified herein, and as modified in U.S. application Ser. Nos. 407,895 and 407,899 filed on the same date as the present application and assigned to the assignee of the present invention. These latter applications are also incorporated by reference herein. It will be recognized that the present invention will be readily applicable to other line powered low power electronic controllers for coin operated telephones which may be developed if it is desired to use those controllers with a carbon microphone or to have the option of employing either a carbon or dynamic microphone with them.

In the low power controller 50, illustrated as a block in FIG. 2 (and shown external to phone 2 although typically, the controller will of course be located within the chassis of the phone 2), an audio network provides an interface for audio signals between the tip and ring lines and the mouthpiece 11 and earpiece 12 in the handset 10. Audio signals from the central office 4 are imposed on the tip 6 and ring 8 offset from any DC voltage present. The signals are ultimately passed to the audio network for processing and sent to earpiece 12 for conversion to audible signals.

During voice transmission from the coin telephone 2, to the central office 4, a caller talks into either carbon microphone 51 or dynamic microphone 51' (shown in FIG. 5) included in mouthpiece 11. The microphone converts the voice signal into electrical signals which are processed by a filter and preamplifier circuit located in the controller 50. A speech network 380 (shown in FIG. 3), also located in the controller 50, processes the filtered signal and ultimately passes the signal to the telephone lines.

Referring to FIG. 3 of the drawings, this figure shows a block diagram of the presently preferred embodiment of the low power control circuit 50. A line interface circuit 55 comprising a ground lifting relay circuit 160 and an off-hook detector circuit 190 connects the tip 6 and ring 8 lines from the central office 4 to a power supply circuit 230. The ground lifting relay circuit 160 also serves to selectively connect the tip and ring lines 6 and 8 to a coin totalizer control circuit 350 comprising a totalizer relay circuit 355, a coin supervisor detector circuit 360, a coin relay circuit 365 and a first coin bypass circuit 370. The interconnection of a coin acceptor 30 which is responsible for accepting and validating coins deposited in coin slot 16 of FIG. 2 is also shown in FIG. 3. The coin acceptor 30 directs accepted coins to a standard coin escrow bucket (not shown). This escrow bucket holds the coins in escrow until completion of the time period for which the coins were deposited and then collects them based on commands from the central office 4 and resulting control signals produced by totalizer control circuit 350. Coin acceptor 30 provides output signals to processing element 100 and in return receives operational control inputs from the processing element 100. Processing element 100 is shown in FIG. 3 as comprising a real time clock 102, memory 104 and microcontroller 110.

Returning to the power supply circuit 230, that circuit is shown in FIG. 3 as having outputs connected to a gate solenoid power circuit 250, a +5V power supply circuit 260, and an audio network 380. More specifically, power supply 230 provides power to a standard DTMF keypad which is presently preferred for use as the keypad 14 of FIG. 2, a DTMF decode circuit 395 and a speech network 390. With the exception of the limited functions powered from battery 511 which is part of a monitor system 510, the power supply circuit 230 in conjunction with control signals from processing element 100 controls the provision of all power for the low power controller 50. Power for the coin routing gate of the coin acceptor 30 is provided through power supply 230, to the gate solenoid power supply 250, and from there to the gate. Power for all the digital electronic components requiring a 5V DC supply is provided through supply 230 to the +5V power supply 260. When the audio network 380 is powered up, it provides the phone 2 with the capability of transmitting and receiving speech and audio tone signals. These signals are transmitted and received as AC voltages on the tip 6 and ring 8 which are offset by the DC voltage applied by the central office 4. The processing element 100 through its single microcontroller 110 controls all the operations of phone 2 including audio network 380, coin acceptor 30, and power supply 230. Microcontroller 110 also records the status of the phone 2 and has the capability of initiating communications during the standby mode if that status warrants it.

Audio network 380 comprises a large number of interconnected blocks under the control of microcontroller 110. More specifically, the speech network 390 is connected to the DTMF decode circuit 395 and the DTMF keypad 14. Further, the speech network 390 is also connected to a coin tone generator 320, a DTMF generator 321, and audio balance circuit 480, a first switch 405, and notch filter circuit 470. The DTMF decode circuit 395, the coin tone generator 320 and the DTMF generator 321 are in turn connected to a modem circuit 400. Modem circuit 400 is also connected to the first switch 405 and a second switch 420. The notch filter circuit 470 is connected through a low pass filter (LPF) circuit 415 to the second switch 420. The second switch 420 is also connected to a microphone in the mouthpiece 11 of the handset 10. First switch 405 is connected to a level adjust circuit 410 which is in turn connected to an ear piece 12 of the handset 10. Handset 10 is further connected to a handset detector circuit 430. The DTMF decode circuit 395, the coin tone generator 320, the DTMF generator 321, the modem 400, the first and second switches 405 and 420, the level adjust 410, the handset detector 430, and the notch filter circuit 470 are all further connected to microcontroller 110 and the monitor system 510.

As its name implies, the monitor system 510 monitors the status of the phone 2. Typically monitor system 510 draws its power from the power supply 230 which is energized by power from the tip 6 and ring 8 lines when the handset 10 is off-hook. Consequently, normal operational power for monitor circuit 520 is provided from the phone line. Further details concerning low power controller 50 can be found in the applications incorporated by reference herein.

Figure 4:
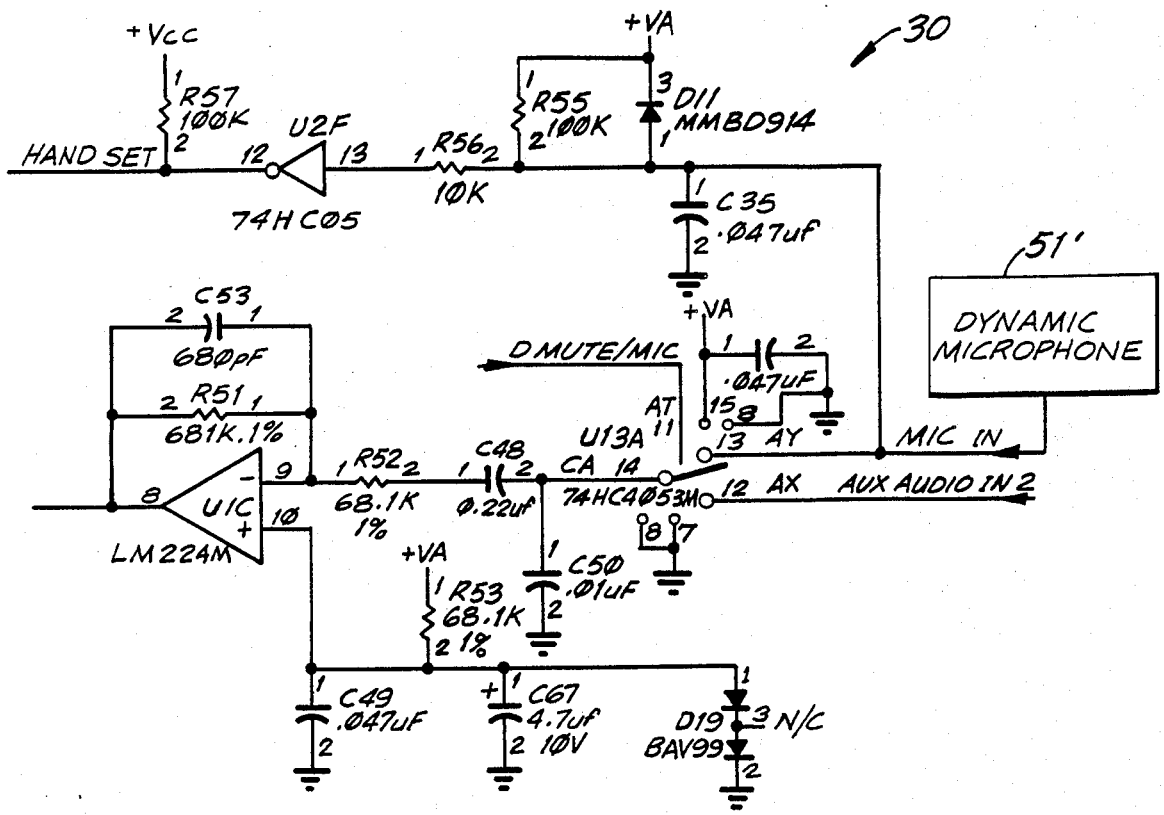
FIG. 4 is a circuit diagram of a prior art preamplifier and handset detection circuit for use with only a dynamic microphone.

FIG. 4 is a circuit diagram of a prior art preamplifier and handset detection circuit 30 corresponding to the block 430 of FIG. 3. The circuit 30 was used in the low power controller of U.S. application Ser. No. 199,129 in conjunction with a dynamic microphone. A small DC current of approximately 50 uA is passed through a resistor R55 to sense whether or not the handset is present by sensing the presence of the dynamic microphone 51' located in the handset. When the output of gate U2F is high, microcontroller 110 determines that the dynamic microphone 51' is present, but if the output of gate U2F is low for a period exceeding ten seconds, then the microphone 51' is deemed missing. The microcontroller 110 takes appropriate action depending on the microphone status including causing a call to the central office to report a handset problem.

The circuit of FIG. 4 also permits the adjustment of volume in the earpiece 12. A push button 23 in the handset 10 of FIG. 2 is in series with the microphone 51' so that when a caller momentarily depresses the pushbutton the circuit to the gate U2F opens so that its output is low. The microcontroller 110 senses the low voltage and controls a resistance network which gradually changes the volume in the earpiece 12. If the pushbutton is depressed for ten seconds or more, the microcontroller 110 assumes that the microphone 51' is missing.

The prior art circuit of FIG. 4 was designed to work in conjunction with a dynamic microphone as part of a low power controller. The preamplifier and handset detection circuit 30 processed a signal, dependent on the location of a switch U13A, from either the dynamic microphone 51' or from modem 400. A microcontroller controlled the switch U13A. The output signal from the preamplifier circuit was then dynamically balanced and output to the line by the audio circuit.

Figure 5:
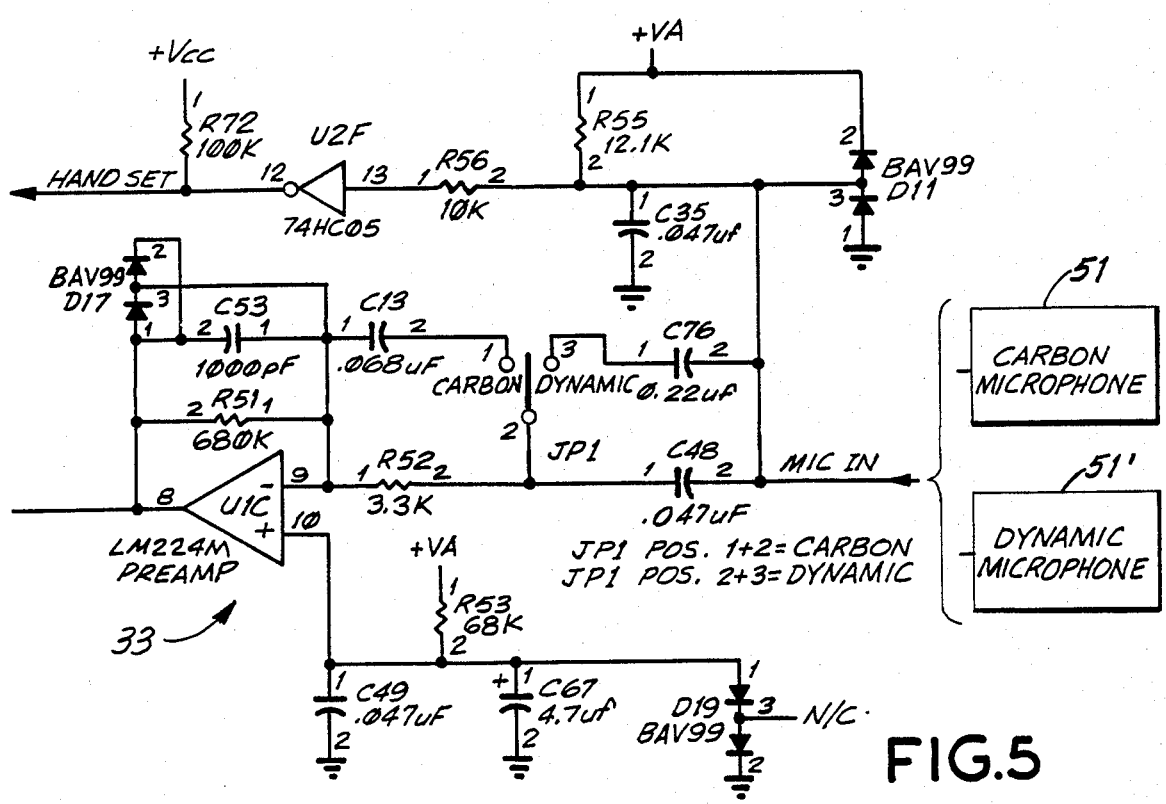
FIG. 5 is a circuit diagram of a preamplifier and handset detection circuit according to the present invention which will readily allow usage of either a carbon microphone or a dynamic microphone.

FIG. 5 is a circuit diagram of a preamplifier and handset detection circuit 33 according to the presently preferred embodiment of the present invention. In FIG. 5, components serving the same function as those found in FIG. 4 are given the same label. FIG. 5 is similar to the prior art circuit of FIG. 4; however, a number of differences exist. The switch U13A and capacitor C50 of FIG. 4 were removed. A jumper JP1, capacitors C13 and C76 and a pair of diodes D11 and D17 were added to FIG. 5 and a number of component values were changed to accommodate the presence of either a dynamic microphone or a carbon microphone in the handset.

Of the changes, the most important are that the value of R55 was changed from 100 k to 12.1 k. This change was made to provide the correct amount of bias for carbon microphone 51. Further, a high pass filter was added to improve the response of the carbon microphone 51. Additionally, the jumper JP1 is used to accommodate either type microphone. When the jumper connects position 2 to position 1 of FIG. 5, the circuit 33 is wired for use with carbon microphone 51. When position 2 is connected to position 3 by jumper JP1, the circuit 33 is wired for use with dynamic microphone 51'. Because the carbon microphone and the dynamic microphone have different frequency responses, different filters are applied with each microphone to improve its audio output.

In FIG. 5, the value of resistor R55 has changed, but it is still used to sense the microphone elements and to set the level of the earpiece as was the case for FIG. 4. The resistor R55 now serves a third purpose, however. By appropriately selecting the value of the resistor R55, the appropriate level of DC bias is fed into the output of the carbon microphone thus making the output of the circuit 33 substantially the same with respect to the remainder of audio circuit 380 regardless of whether a carbon or dynamic microphone 51 or 51' is connected to the MIC IN line.

The preamplifier circuit 33 also includes an amplifier U1C. The values for capacitor C53 and resistors R51 and R52 have changed but their function has not. These values were changed to accommodate standard values for capacitors C48 and C13 and also to accommodate the voltage drops across a diode pair D17. The diode pair D17 was added to provide audio limiting for the circuit 33.

When jumper JP1 connects positions 2 and 3, capacitor C76 is switched into the circuit in order to provide a low-pass frequency response improvement for the dynamic microphone. In this configuration, the circuit of FIG. 5 works with a dynamic microphone in a similar fashion to the circuit of FIG. 4, described above. The circuit 33 processes and forwards the microphone output signal to other portions of audio circuit 380 which further process and then dynamically balance the signal before it is put out onto the phone lines.

The circuit of FIG. 5 is versatile and is novel in its approach to the use of a carbon microphone in the telephone handset. In the prior art, a minimum of approximately 5 mA was required to operate a carbon microphone in its normal operation in a payphone because the microphone passively balanced the telephone line. In the present invention, the carbon microphone no longer balances the line and only uses approximately 330 uA. The audio circuit 390 of the low power controller 50 dynamically balances the line and also isolates the carbon microphone from the line so that the small DC current of 330 uA is sufficient for operation. This same current is used for handset detection testing.

Therefore, if a low power controller is to be used in a coin operated telephone containing a carbon microphone, there is no longer a need to replace the carbon microphone with a dynamic microphone for the controller to operate correctly. Further, the present invention readily permits usage of either type of microphone.

I claim:

1. A low power, coin operated telephone controller for controlling a coin operated telephone which has an on-hook state and an off-hook state, said controller being energized with power from tip and ring lines of a loop circuit from a central office during said telephone's off-hook state, said controller having:
   a standby mode during said telephone's on-hook state in which substantially no power is drawn by said controller from the tip and ring lines of the loop circuit;
   an audio network;
   a totalizer control;
   a coin mechanism for testing coins and for generating coin data for each coin deposited into said telephone;
   a power supply circuit having a plurality of outputs and which is energized with power from said tip and ring lines of the loop circuit for energizing said telephone controller during said telephone's off-hook state;
   interface circuitry for set up of status indicators and for monitoring telephone conditions during periods when no current is available between the tip and ring lines; and
   a single processing element comprising timing means for establishing times or durations of events or calls, and nonvolatile digital memory for storing a plurality of bits of data during both the off-hook state and the on-hook state of the coin operated telephone, for processing said coin data, and for controlling operation of said audio network, said interface circuitry and said power supply circuit wherein,
   said audio network further comprises a carbon microphone.

2. A low power, coin operated telephone controller for controlling a coin operated telephone which has an on-hook state and an off-hook state, said controller being energized with power from tip and ring lines of a loop circuit from a central office during said telephone's off-hook state, said controller having:
   a standby mode during said telephone's on-hook state in which substantially no power is drawn by said controller from the tip and ring lines of the loop circuit;
   an audio network;
   a totalizer control means for signalling accepted coin value to the central office;
   an electronic coin mechanism which generates coin data in the form of electrical signals for each coin deposited into said telephone;
   a power supply circuit having a plurality of outputs and which is energized with power from said tip and ring lines of the loop circuit for energizing said telephone controller during said telephone's off-hook state;
   interface circuitry for set up of status indicators and for monitoring telephone conditions during periods when no current is available between the tip and the ring lines; and
   a single processing element comprising timing means for establishing times or durations of events or calls, and nonvolatile memory for storing data during off-hook state and on-hook state, for processing said coin data and controlling the electronic coin mechanism, and for controlling operation of said audio network, said interface circuitry and said power supply, said processing element controlling power distribution to each of said controller's components, enabling each of said components only as their function is needed, wherein
   said audio network further comprises a carbon microphone.

3. An improved low power, coin operated telephone control circuit comprising:
   a carbon microphone input circuit for connection to a carbon microphone output signal, said input circuit adding an appropriate bias level to the carbon microphone output signal and producing a biased output signal, the appropriate bias level being significantly less than 5 mA; and
   an amplifier circuit having an input connected to receive the biased output signal, said amplifier amplifying the input and producing an amplified output signal.

4. The apparatus of claim 3, further comprising a high pass filter to improve the quality of the biased output signal.

5. The apparatus of claim 3, further comprising a simple connection to allow said circuit to switch from compatibility with the carbon microphone to compatibility with a dynamic microphone.

6. The apparatus of any one of claims 1, 2 or 3, wherein the carbon microphone is driven with a current on the order of 500 uA or less.

7. The apparatus of any one of claims 1, 2 or 3, wherein the carbon microphone can be readily replaced with a dynamic microphone without significant circuit alteration.

8. The apparatus of any one of claims 1 or 2, wherein a small DC current is applied to bias the carbon microphone and wherein said small DC current is also employed to detect the condition of a handset containing the carbon microphone.

9. An improved low power, coin operated telephone control circuit comprising:
   a carbon microphone input circuit for connection to a carbon microphone output signal, said input circuit adding an appropriate bias level to the carbon microphone output signal and producing a biased output signal, the appropriate bias level being significantly less than 5 mA, wherein the small DC current applied to bias the carbon microphone is also employed to detect the condition of the handset containing the carbon microphone; and an amplifier circuit having an input connected to receive the biased output signal, said amplifier amplifying the input and producing an amplified output signal.

10. The apparatus of claim 7, further comprising a low pass filter to improve the quality of the output signal.

11. An improved low power, coin operated telephone control circuit for retrofitting to a standard pay telephone, comprising:

a preamplifier and handset detection circuit which accepts either a carbon microphone or a dynamic microphone output signal, said circuit implementing appropriate compensation dependent on which microphone is being used, wherein the maximum power consumed by the circuit is significantly less than 5 mA, and wherein the output of the circuit is substantially the same for either microphone type.

12. The apparatus of claim 11, wherein an audio circuit processes the output signal from the preamplifier and handset detection circuit and dynamically balances the line.

13. The apparatus of claim 11, wherein the preamplifier and handset detection circuit biases the carbon microphone with the same small current used to detect the handset.

14. The apparatus of claim 11, further comprising a simple connection to allow the preamplifier and handset detection circuit to switch from compatibility with a carbon microphone to compatibility with a dynamic microphone.

15. The apparatus of claim 14, further comprising a high pass filter to enhance the output signal when a carbon microphone is used, and a low pass filter to enhance the output signal when a dynamic microphone is used.

16. An improved low power, coin operated telephone control circuit is retrofitting to a standard pay telephone which has an on-hook state and an off-hook state, the controller being energized with power from the tip and ring lines of a loop circuit from a central office during the off-hook state, comprising:

a standby mode during the on-hook state in which substantially no power is drawn from the tip and ring lines;

an audio network which dynamically balances the line; and a preamplifier and handset detection circuit which accepts the output of either a dynamic microphone or a carbon microphone, the circuit containing a simple switching means to allow compatibility with whichever microphone type is present in the handset, wherein the output of the circuit is substantially the same for either microphone type and is processed by the audio network.

17. The apparatus of claim 16, wherein substantially less than 5 mA is required by the preamplifier and handset detection circuit to operate when either a carbon or dynamic microphone is being used.

18. The apparatus of claim 17, wherein less than 5 uA is required to bias the carbon microphone.

19. The apparatus of claim 17, wherein the same small DC current used to detect the condition of the handset is used to bias the carbon microphone.

20. The apparatus of claim 16, further comprising a high pass filter to enhance the output signal of the preamplifier and handset detection circuit when the switching means is positioned for a carbon microphone, and a low pass filter to enhance the output signal when the switching means is positioned for a dynamic microphone.

21. A low power, coin operated telephone controller for controlling a coin operated telephone which has an on-hook state and an off-hook state, said controller being energized with power from tip and ring lines of a loop circuit from a central office during said telephone's off-hook state, said controller having:

a standby mode during said telephone's on-hook state in which substantially no power is drawn by said controller from the tip and ring lines of the loop circuit;

an audio network;

a totalizer control;

a coin mechanism for testing coins and for generating coin data for each coin deposited into said telephone;

a power supply circuit having a plurality of outputs and which is energized with power from said tip and ring lines of the loop circuit for energizing said telephone controller during said telephone's off-hook state;

interface circuitry for set up of status indicators and for monitoring telephone conditions during periods when no current is available between the tip and ring lines; and a single processing element comprising timing means for establishing times or durations of events or calls, and nonvolatile digital memory for storing a plurality of bits of data during both the off-hook state and the on-hook state of the coin operated telephone, for processing said coin data, and for controlling operation of said audio network, said interface circuitry and said power supply circuit wherein, said audio network further comprises a carbon microphone which utilizes substantially less than 5 milliamperes in its operation.

22. A low power, coin operated telephone controller for controlling a coin operated telephone which has an on-hook state and an off-hook state, said controller being energized with power from tip and ring lines of a loop circuit from a central office during said telephone's off-hook state, said controller having:

a standby mode during said telephone's on-hook state in which substantially no power is drawn by said controller from the tip and ring lines of the loop circuit;

an audio network;

a totalizer control means for signalling accepted coin value to the central office;

an electronic coin mechanism which generates coin data in the form of electrical signals for each coin deposited into said telephone;

a power supply circuit having a plurality of outputs and which is energized with power from said tip and ring lines of the loop circuit for energizing said telephone controller during said telephone's off-hook state;

interface circuitry for set up of status indicators and for monitoring telephone conditions during periods when no current is available between the tip and the ring lines; and a single processing element comprising timing means for establishing times or durations of events or calls, and nonvolatile memory for storing data during off-hook state and on-hook state, for processing said coin data and controlling the electronic coin mechanism, and for controlling operation of said audio network, said interface circuitry and said power supply, said processing element controlling power distribution to each of said controller's components, enabling each of said components only as their function is needed, wherein said audio network further comprises a carbon microphone, said processing element causing the distribution of substantially less than 5 milliamperes of current to the carbon microphone for its operation.

23. An improved low power, telephone control circuit comprising:

a carbon microphone input circuit for connection to a carbon microphone output signal, said input circuit adding an appropriate bias level to the carbon microphone output signal and producing a biased output signal, the appropriate bias level being significantly less than 5 mA;

an amplifier circuit having an input connected to receive the biased output signal, said amplifier amplifying the input and producing an amplified output signal; and an audio network circuit for receiving the amplified output signal, the audio network dynamically balancing the line and isolating the carbon microphone from the line.

* * * * *

UNITED STATES PATENT AND TRADEMARK OFFICE
CERTIFICATE OF CORRECTION

PATENT NO. : 4,985,910
DATED : January 15, 1991
INVENTOR(S) : McGarry

It is certified that error appears in the above—identified patent and that said Letters Patent is hereby corrected as shown below:

On Title page item [57]:

In the Abstract:

In line 3, delete "dynamid" and insert --dynamic--.

Claim 16, column 9, line 45, delete "is" and insert --for--.

On Title page item [57]:

In the Abstract:

In line 11, delete "us" and insert --is--.

Signed and Sealed this

Ninth Day of March, 1993

Attest:

STEPHEN G. KUNIN

Attesting Officer

Acting Commissioner of Patents and Trademarks